United States Patent
Hirota

(10) Patent No.: US 9,654,657 B2
(45) Date of Patent: May 16, 2017

(54) IMAGE FORMING APPARATUS

(71) Applicant: KYOCERA Document Solutions Inc., Osaka (JP)

(72) Inventor: Masato Hirota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/160,564

(22) Filed: May 20, 2016

(65) Prior Publication Data

US 2016/0352942 A1  Dec. 1, 2016

(30) Foreign Application Priority Data

May 27, 2015  (JP) .................. 2015-106991

(51) Int. Cl.
*H04N 1/00* (2006.01)

(52) U.S. Cl.
CPC ..... *H04N 1/00663* (2013.01); *H04N 1/00037* (2013.01); *H04N 1/00074* (2013.01); *H04N 1/00631* (2013.01); *H04N 2201/0094* (2013.01)

(58) Field of Classification Search
CPC .................................. H04N 1/00663
USPC ........................................ 358/1.15
See application file for complete search history.

(56) References Cited

U.S. PATENT DOCUMENTS

| 2008/0193146 A1* | 8/2008 | Yamada | G03G 15/50 399/79 |
| 2014/0160524 A1* | 6/2014 | Anno | G03G 15/502 358/1.15 |
| 2016/0352941 A1* | 12/2016 | Hirota | H04N 1/00663 |

FOREIGN PATENT DOCUMENTS

| JP | 2001-160179 A | 6/2001 |
| JP | 2002-204325 A | 7/2002 |
| JP | 2006-150778 A | 6/2006 |
| JP | 2013-054209 A | 3/2013 |

* cited by examiner

*Primary Examiner* — Jacky X Zheng

(74) *Attorney, Agent, or Firm* — Studebaker & Brackett PC

(57) ABSTRACT

An image forming apparatus includes an exit tray, an image forming section, a print controller, a user identification section, a fetch sensor, and a notification managing section. The image forming section performs printing on a sheet and ejects the printed sheet onto the exit tray. The print controller causes the image forming section to perform printing. The user identification section identifies the user and manages log-in and log-out status of the user. The fetch sensor detects whether or not the ejected printed sheet is fetched. The notification managing section changes, based on the user log-in or log-out status at completion of printed sheet ejection onto the exit tray and based on whether or not the printed sheet ejected onto the exit tray is fetched, a content of a notification that is to be issued to the user after completion of printed sheet ejection.

5 Claims, 8 Drawing Sheets

IMAGE FORMING APPARATUS

INCORPORATION BY REFERENCE

The present application claims priority under 35 U.S.C. §119 to Japanese Patent Application No. 2015-106991, filed on May 27, 2015. The contents of this application are incorporated herein by reference in their entirety.

BACKGROUND

The present disclosure relates to an image forming apparatus that warns misplacement of a printed sheet.

Various techniques have been proposed for reducing user the inconvenience of being kept waiting in front of an image forming apparatus until the image forming apparatus completes printing. Specifically, a technique has been proposed in which a user who leaves the image forming apparatus can fetch a printed sheet after print completion.

In a first typical technique, an image forming apparatus transmits to a user a notification informing that print completion is approaching when print completion comes near. Further, the image forming apparatus transmits to the user a notification of print completion.

In a second typical technique, a user sets to an image forming apparatus an address to which a notification of print completion is to be transmitted. Through the setting, an email or the like is transmitted to the set address upon print completion.

In a third typical technique, a user identification (ID) of a user who instructs printing is recognized. A message notifying print completion is then transmitted to a destination address associated with the user ID.

Another problem in image forming apparatuses is that a printed sheet ejected from an image forming apparatus may be misplaced on an exit tray of the image forming apparatus without being fetched. A technique proposed for tackling the above problem is as follows.

An image forming apparatus in a fourth typical technique stores therein a history of a user who instructs printing. In a situation in which the user identified by the image forming apparatus leaves the image forming apparatus without fetching an ejected printed sheet, the image forming apparatus issues a notification informing misplacement of the printed sheet to a contact address of the user.

SUMMARY

An image forming apparatus according to the present disclosure includes a communication circuit, an exit tray, an image forming section, a print controller, a user identification section, a fetch sensor, and a notification managing section. The communication circuit receives a print instruction from a user. The image forming section performs printing on a sheet and ejects the printed sheet onto the exit tray. The print controller causes the image forming section to perform printing based on the print instruction. The user identification section identifies the user and manages log-in and log-out status of the user. The fetch sensor detects whether or not the printed sheet ejected onto the exit tray is fetched. The notification managing section changes, based on the user log-in or log-out status at completion of printed sheet ejection onto the exit tray and based on whether or not the printed sheet ejected onto the exit tray is fetched, a content of a notification that is to be issued to the user after completion of printed sheet ejection.

DETAILED DESCRIPTION

The following describes an image forming apparatus according to embodiments of the present disclosure with reference to the drawings.

Overview

Figure 1:
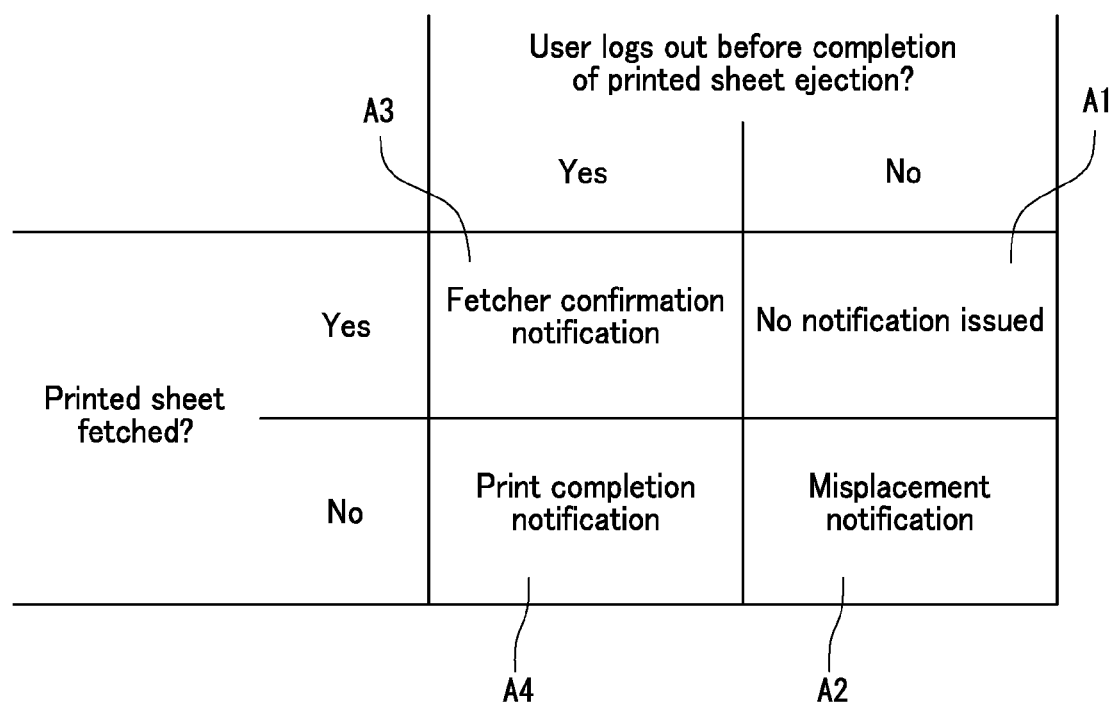
FIG. 1 illustrates an example overview of processing performed by an image forming apparatus according to an embodiment of the present disclosure.

Description will be made first about an overview of processing performed by an image forming apparatus (multifunction peripheral (MFP)). FIG. 1 illustrates an example overview of the processing performed by the image forming apparatus according to the embodiment of the present disclosure. The image forming apparatus in the example illustrated in FIG. 1 includes a single exit tray. A printed sheet is ejected onto the exit tray. The image forming apparatus further includes a fetch sensor to detect whether or not a printed sheet ejected onto the exit tray is fetched.

As illustrated in FIG. 1, the image forming apparatus according to the embodiment of the present disclosure changes a notification description for notification to a user. Specifically, the notification description for notification to a user is changed based on whether or not a printed sheet on the exit tray that is ejected in response to a print instruction from the user is fetched from the exit tray. Further, the notification description for notification to a user is changed based on whether or not a user who logs in the image forming apparatus in front of the image forming apparatus logs out before completion of printed sheet ejection.

Reference sign A1 in FIG. 1 indicates a situation in which a user does not log out before completion of printed sheet ejection. Specifically, the situation A1 is that a user who stays in front of the image forming apparatus until completion of printed sheet ejection fetches the printed sheet. In the above situation, the image forming apparatus determines that the user who instructs printing fetches the printed sheet, and does not issue any notification.

Reference sign A2 in FIG. 1 indicates a situation in which a user does not log out before completion of printed sheet ejection. Specifically, the situation A2 is that a user who stays in front of the image forming apparatus until completion of printed sheet ejection leaves the image forming apparatus but the printed sheet is not fetched. In the above situation, the image forming apparatus determines that the user leaves the image forming apparatus without fetching the printed sheet, and issues a misplacement notification that reminds the user to fetch the printed sheet. The misplacement notification is a notification that reminds the user to fetch a printed sheet.

Reference sign A3 in FIG. 1 indicates a situation in which a user who logs out before completion of printed sheet ejection leaves the image forming apparatus and the printed sheet is fetched. In the above situation, the image forming apparatus determines that an unknown user fetches the printed sheet. The image forming apparatus then issues a fetcher confirmation notification that informs the user of the printed sheet being fetched by someone.

Reference sign A4 in FIG. 1 indicates a situation in which a user who logs out before completion of printed sheet ejection leaves the image forming apparatus and the printed sheet is not fetched. In the above situation, the image forming apparatus issues a print completion notification to the user.

As described above, the image forming apparatus according to the embodiment of the present disclosure changes a notification description (content) of a notification that is to be issued to a user after completion of printed sheet ejection based on whether or not the user logs out at completion of printed sheet ejection and based on whether or not an ejected printed sheet is fetched.

Figure 2:
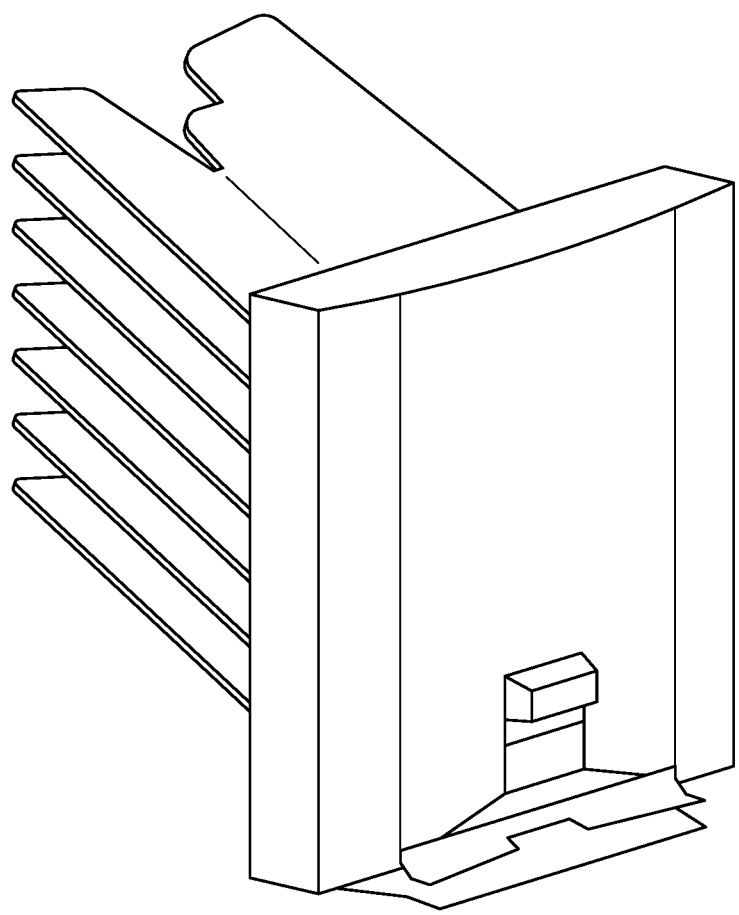
FIG. 2 illustrates an example of a mail box.

Description has been made about the overview of the processing performed by the image forming apparatus according to the embodiment of the present disclosure. The image forming apparatus in the above description includes, but is not limited to include, a single exit tray onto which a printed sheet is ejected. Alternatively, for example, the image forming apparatus may eject a printed sheet onto a mail box illustrated in FIG. 2, rather than the exit tray.

The mail box includes exit trays preset for individual users. Users' printed sheets are ejected onto the individual exit trays.

Configuration

Figure 3:
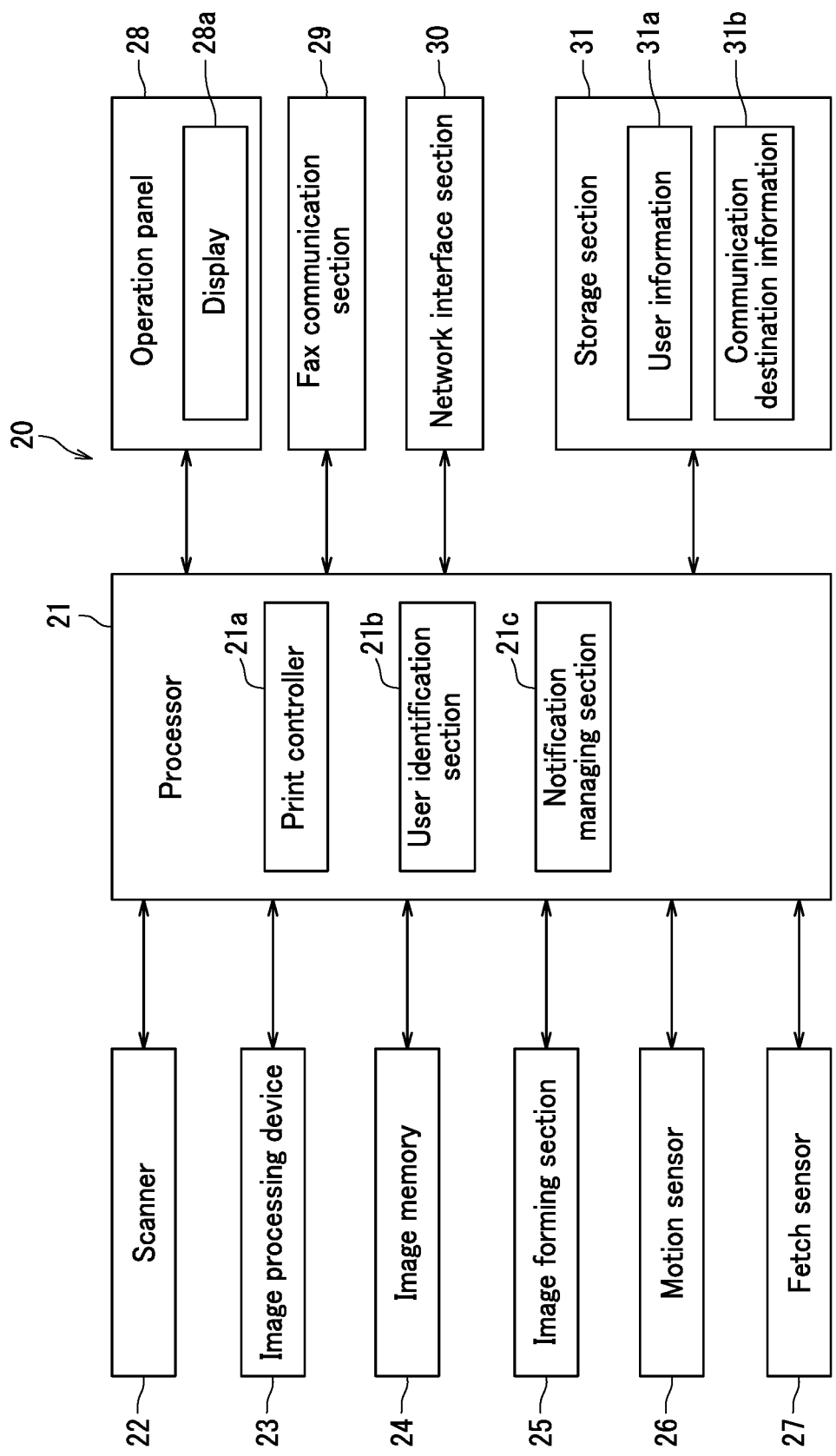
FIG. 3 is a block diagram illustrating an image forming apparatus according to an embodiment of the present disclosure.

Following describes a configuration of an image forming apparatus 20 according to an embodiment of the present disclosure. FIG. 3 is a block diagram illustrating the configuration of the image forming apparatus 20.

As illustrated in FIG. 3, the image forming apparatus 20 includes a scanner 22, an image processing device 23, an image memory 24, an image forming section 25, a motion sensor 26, a processor 21, an operation panel 28, a fax communication section 29, a network interface section 30, and a storage device 31 in addition to the fetch sensor 27. The network interface section 30 is an example of a communication circuit.

The scanner 22, the image processing device 23, the image memory 24, the image forming section 25, the motion sensor 26, the fetch sensor 27, the processor 21, the operation panel 28, the fax communication section 29, the network interface section 30, and the storage device 31 each include at least one circuit. The circuit herein may be an electronic component or an electronic substrate in which a plurality of electronic elements are connected together.

Furthermore, the scanner 22, the image processing device 23, and the operation panel 28 may each include a circuit including a processor such as a central processing unit (CPU). The circuit including the processor can execute various programs through reading and execute various programs preinstalled therein.

The processor 21 includes a CPU, a hardware circuit dedicated to the image forming apparatus 20, etc. The processor 21 controls an overall operation of the image forming apparatus 20 through execution of control programs stored in the storage device 31.

The processor 21 is connected to the scanner 22, the image processing device 23, the image memory 24, the image forming section 25, the motion sensor 26, the fetch sensor 27, the operation panel 28, a display 28a included in the operation panel 28, the fax communication section 29, the network interface section 30, the storage device 31, etc. The processor 21 controls each operation of the connected elements. Furthermore, the processor 21 transmits and receives signals or data to and from the above elements.

The processor 21 performs, based on a job instruction input by a user, drive control on a corresponding mechanism and executes corresponding processing. Through the above, various functions (for example, a scan function, printing function, copy function, and facsimile function) are implemented. The job instruction is input to the image forming apparatus 20 through the operation panel 28 or a personal computer (PC) or the like connected via a network.

The processor 21 executes using the CPU programs loaded on a random access memory (RAM) from a read only memory (ROM) or the like to operate as a print controller 21a, a user identification section 21b, and a notification managing section 21c.

The print controller 21a controls operation of the image forming section 25. Specifically, the print controller 21a causes the image forming section 25 to perform printing. A printed sheet printed by the image forming section 25 is ejected onto the exit tray by the image forming section 25.

The user identification section 21b performs user identification (first identification) for identifying a user who inputs a print instruction to the image forming apparatus 20 and user identification (second identification) for identifying a user who fetches the printed sheet from the exit tray. The user identification section 21b manages user log-in and log-out status with respect to the image forming apparatus 20.

The notification managing section 21c issues various notifications to a user (for example, the misplacement notification, fetcher confirmation notification, and print completion notification).

The scanner 22 reads an image from an original document and generates image data from the image.

The image processing device 23 includes an application specific integrated circuit (ASIC). The image processing device 23 performs image processing on the image data of the image read by the scanner 22 as necessary. For example, the image processing device 23 performs image processing such as shading correction in order to improve image quality in printing of an image read by the scanner 22 on a sheet.

The image memory 24 temporarily stores therein image data. Examples of the image data stored in the image memory 24 include image data of an image read by the scanner 22 and image data of an image to be printed by the image forming section 25.

The image forming section 25 performs image formation based on image data. The image forming section 25 performs image formation (printing) based on for example image data of an image read by the scanner 22. Furthermore, the image forming section 25 ejects onto the exit tray a sheet on which an image is formed. Hereinafter, a sheet on which an image is formed may be referred to as a printed sheet.

The motion sensor 26 detects whether or not a person leaves the image forming apparatus 20. The motion sensor 26 in the present embodiment detects whether or not a person leaves the front of the image forming apparatus 20.

The motion sensor 26 may be a quantum infrared sensor or a thermal infrared sensor, for example.

The fetch sensor 27 detects whether or not the exit tray is empty. In the present embodiment, when a printed sheet ejected onto the exit tray is fetched, the fetch sensor 27 detects that the exit tray is empty. The fetch sensor 27 may be a thru-beam sensor.

The operation panel 28 receives, from a user, instructions for various operations and processing that the image forming apparatus 20 executes. The operation panel 28 includes a touch panel and an operation key. The display 28a may be a liquid crystal display (LCD) including a touch sensor, for example.

The fax communication section 29 includes an encoding and decoding section, a modem section, and a network control unit (NCU). The fax communication section 29 performs facsimile transmission using a public telephone network.

The network interface section 30 includes a communication module (for example, a local area network (LAN) board). The network interface section 30 transmits and receives various data to and from a device such as a PC within a local area via a LAN or the like connected to the network interface section 30.

The storage device 31 is a memory having a region in which various data is to be stored. The storage device 31 stores therein image data of an image read by the scanner 22, for example. The storage device 31 further stores (spools) therein print data for which a user instructs printing. The storage device 31 includes a semiconductor storage device and a mass storage device (for example, a hard disk drive (HDD)). The semiconductor storage device may include a RAM and a ROM, for example. The RAM and the ROM may be included in a hardware circuit of the processor 21. Examples of the various data to be stored in the storage device 31 include user information 31a and notification destination information 31b.

The user information 31a is used for user identification by the user identification section 21b.

The notification destination information 31b is used for issuance of various notifications. The notification destination information 31b is address information.

Through the above, a description has been made about the configuration of the image forming apparatus 20.

Process Flow (For Print Data Spooling)

Figure 4:
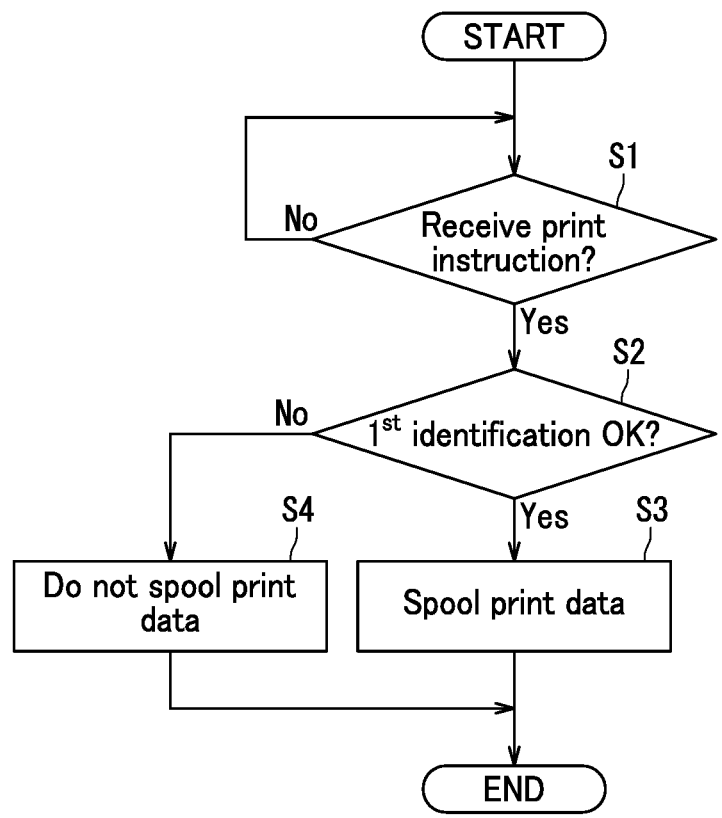
FIG. 4 depicts a process flow for print data spooling by the image forming apparatus.

With reference to FIG. 4, description will be made next about a process flow for print data spooling by the image forming apparatus 20. FIG. 4 is a flowchart depicting the process flow for print data spooling by the image forming apparatus 20.

First, as depicted in FIG. 4, the print controller 21a determines whether or not a print instruction is received from a user via a PC or the like (Step S1).

When the print controller 21a determines that no print instruction is received (No at Step S1), the routine returns to Step 1. The print controller 21a then waits until a print instruction is received.

When the print controller 21a determines that a print instruction is received (Yes at Step S1), the user identification section 21b then performs user identification (first identification) at receipt of a print instruction. The user identification section 21b then determines whether or not the first identification results in identity (Step S2).

When the user identification section 21b determines that the first identification results in identity (Yes at Step S2), the print controller 21a spools received print data to the storage device 31 (Step S3).

When the user identification section 21b determines that the first identification results in non-identification (No at Step S2), the print controller 21a does not spool the received print data to the storage device 31 (Step S4).

Through the above, a description has been made about the process flow for print data spooling by the image forming apparatus 20 based on a print instruction from a user.

Process Flow (For Issuance of Notifications)

Figure 5A:
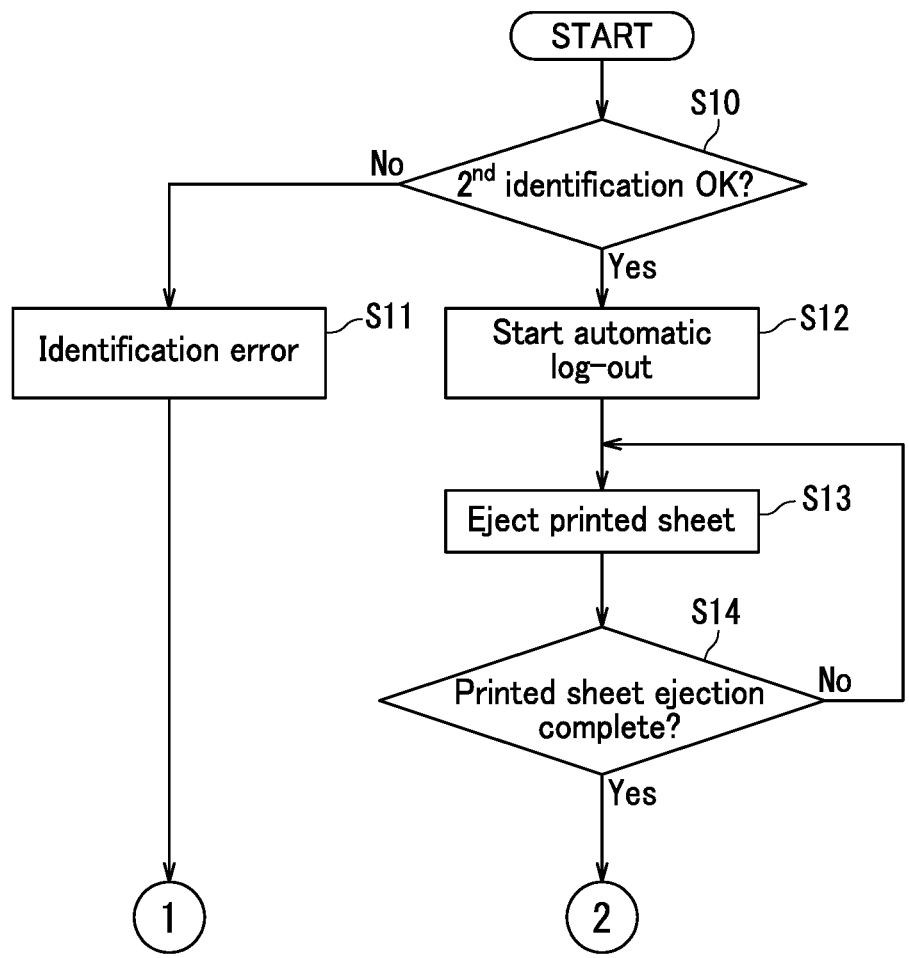
FIG. 5A depicts a former half of a process flow for issuance of various notifications by the image forming apparatus.
Figure 5B:
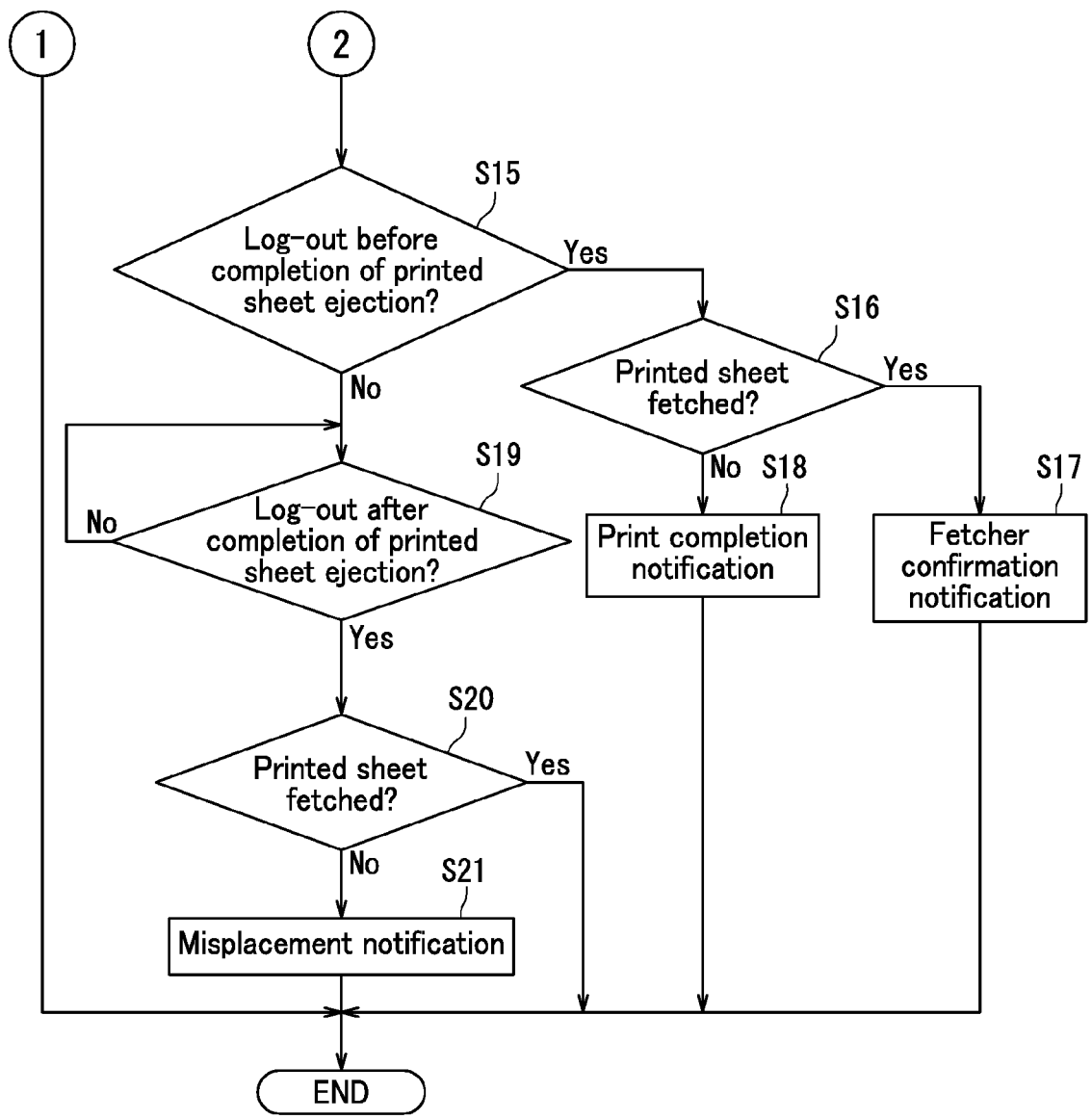
FIG. 5B depicts a latter half of the process flow for issuance of the various notifications by the image forming apparatus.

With reference to FIGS. 5A and 5B, description will be made below about a process flow for issuance of the respective notifications by the image forming apparatus 20. Specifically, a process flow from execution of the second identification to issuance of the respective notifications will be described. FIGS. 5A and 5B depict the process flow for issuance of the respective notifications by the image forming apparatus 20.

Note that a user who comes in front of the image forming apparatus 20 in order to fetch a printed sheet performs a log-in operation on the image forming apparatus 20 through the operation panel 28 in the example depicted in FIGS. 5A and 5B. The user identification section 21b executes the second identification for the user who comes in front of the image forming apparatus 20 for fetching the printed sheet. When the second identification results in identity, printing is performed and a printed sheet is ejected through execution of the user print instruction.

Specifically, the user identification section 21b performs the second identification to determine whether or not the user is qualified to log in the image forming apparatus 20 (Step S10).

When the user identification section 21b determines that the user is not qualified to log in the image forming apparatus 20 (No at Step S10), the user identification section 21b determines that the second identification results in non-identification, that is, determines that the identification result indicates identification error (Step S11). The routine then ends.

By contrast, when the user identification section 21b determines that the user is qualified to log in the image forming apparatus 20 (Yes at Step S10), the user identification section 21b starts automatic log-out, which will be described later in detail (Step SS12).

Subsequently, the print controller 21a controls the operation of the image forming section 25 so that a printed sheet is ejected (Step S13).

Note that the printed sheet is ejected by pull printing or copy output in the example depicted in FIGS. 5A and 5B. Pull printing is processing in which a printed sheet printed based on spooled print data is ejected upon log-in on an image forming apparatus. Specifically, when a user inputs a print instruction through a user's own PC or the like, print data corresponding to the print instruction is transmitted to the image forming apparatus 20. The print data transmitted to the image forming apparatus 20 is spooled in the storage device 31 of the image forming apparatus 20. When the user comes in front of the image forming apparatus 20 and performs a log-in operation, a printed sheet based on the spooled print data is ejected.

Copy output is processing in which a printed sheet printed based on image data generated by the scanner 22 reading an image from an original document is ejected. Specifically, when a user comes in front of the image forming apparatus 20 and instructs copying to the image forming apparatus 20, the scanner 22 reads a loaded original document and generates image data. The image forming section 25 prints an image based on the generated image data and ejects a printed sheet.

Next, the print controller 21a determines whether or not printed sheet ejection by the image forming section 25 is complete (Step S14).

When the print controller 21a determines that printed sheet ejection is not complete (No at Step S14), the routine returns to Step S13.

When the print controller 21a determines that printed sheet ejection is complete (Yes at Step S14), the notification managing section 21c determines whether or not the user logs out of the image forming apparatus 20 before completion of printed sheet ejection (Step S15).

When the notification managing section 21c determines that the user logs out of the image forming apparatus 20 before completion of printed sheet ejection by the image forming section 25 (Yes at Step S15), the notification managing section 21c determines based on a result of detection by the fetch sensor 27 whether or not the printed sheet is fetched from the exit tray (Step S16).

When the notification managing section 21c determines that the printed sheet is fetched from the exit tray (Yes at Step S16), the notification managing section 21c issues the fetcher confirmation notification to the user by referencing the notification destination information 31b (Step S17).

By contrast, when the notification managing section 21c determines that the printed sheet is not fetched from the exit tray (No at Step S16), the notification managing section 21c issues the print completion notification to the user by referencing the notification destination information 31b (Step S18).

At Step S15, when the notification managing section 21c determines that the user does not log out of the image forming apparatus 20 before completion of printed sheet ejection by the image forming section 25 (No at Step S15), the notification managing section 21c determines whether or not the user logs out of the image forming apparatus 20 after completion of printed sheet ejection (Step S19).

When the notification managing section 21c determines that the user does not yet log out of the image forming apparatus 20 even after completion of printed sheet ejection (No at Step S19), the routine returns to Step S19.

When the notification managing section 21c determines that the user logs out of the image forming apparatus 20 after completion of printed sheet ejection (Yes at S19), the notification managing section 21c determines based on a result of detection by the fetch sensor 27 whether or not the printed sheet is fetched from the exit tray of the image forming apparatus 20 (Step S20).

When the notification managing section 21c determines that the printed sheet is fetched from the exit tray of the image forming apparatus 20 (Yes at S20), the notification managing section issues no notification.

By contrast, when the notification managing section 21c determines that the printed sheet is not fetched from the exit tray of the image forming apparatus 20 (No at S20), the notification managing section 21c issues the misplacement notification to the user by referencing the notification destination information 31b (Step S21).

Through the above, a description has been made about the process flow from the second identification to issuance of the respective notifications by the image forming apparatus 20.

Process Flow (For Automatic Log-Out)

Figure 6:
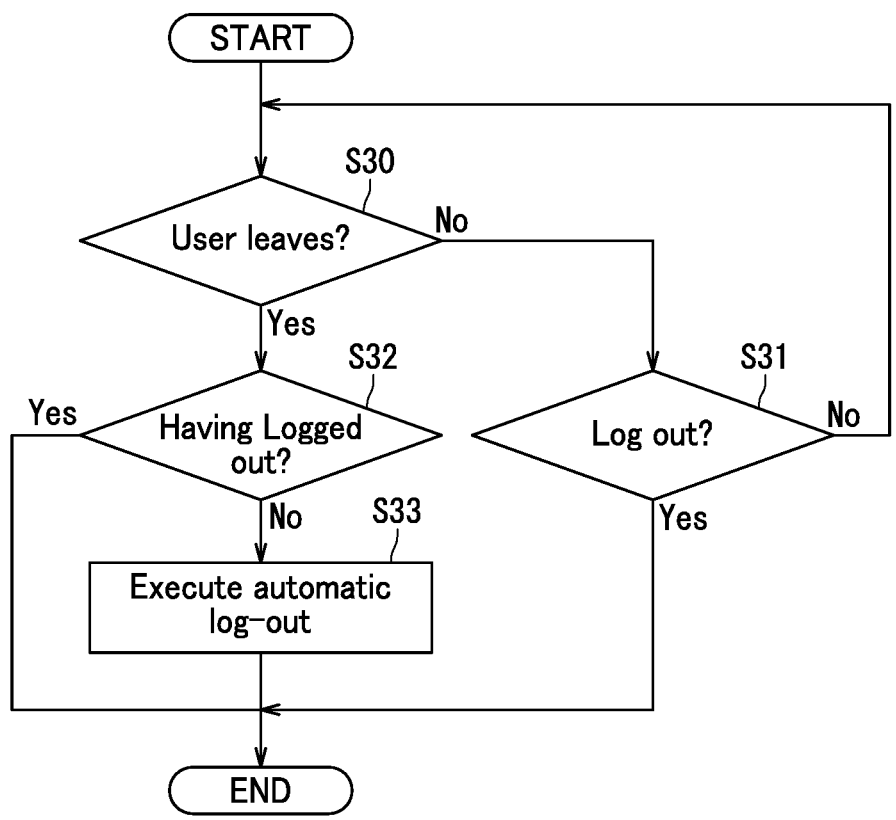
FIG. 6 depicts a process flow for automatic log-out.

A process flow for automatic log-out will be described next. Automatic log-out is performed when a user logging in the image forming apparatus 20 in front of the image forming apparatus 20 leaves the image forming apparatus 20. FIG. 6 is a flowchart depicting the process flow for automatic log-out. In the example depicted in FIG. 6, the user identification section 21b has already determined that a person detected by the motion sensor 26 is a user logging in the image forming apparatus 20.

First, the user identification section 21b determines based on a result of detection by the motion sensor 26 whether or not the user leaves the image forming apparatus 20 (Step S30).

When the user identification section 21b determines that the user does leave the image forming apparatus 20 (No at Step S30), the user identification section 21b determines whether or not the user logs out of the image forming apparatus 20 (Step S31). The user can log out of the image forming apparatus 20 by operating the operation panel 28.

When the user identification section 21b determines that the user does not log out of the image forming apparatus 20 (No at Step S31), the routine returns to Step S30 and the user identification section 21b continues the processing.

By contrast, when the user identification section 21b determines that the user logs out of the image forming apparatus 20 (Yes at Step S31), the routine ends.

When determination by the user identification section 21b at Step S30 is that the user leaves the image forming apparatus 20 (Yes at S30), the user identification section 21b determines whether or not the user has logged out of the image forming apparatus 20 (Step S32).

When the user identification section 21b determines that the user has logged out of the image forming apparatus 20 (Yes at Step S32), the routine ends.

When the user identification section 21b determines that the user has not yet logged out of the image forming apparatus 20 (No at Step S32), the user identification section 21b performs log out processing (automatic log-out) to cause log-out of the image forming apparatus 20 for the user who logs in (Step S33).

Through the above, a description has been made about the process flow for automatic log-out.

Image Forming Apparatus Configuration

Figure 7:
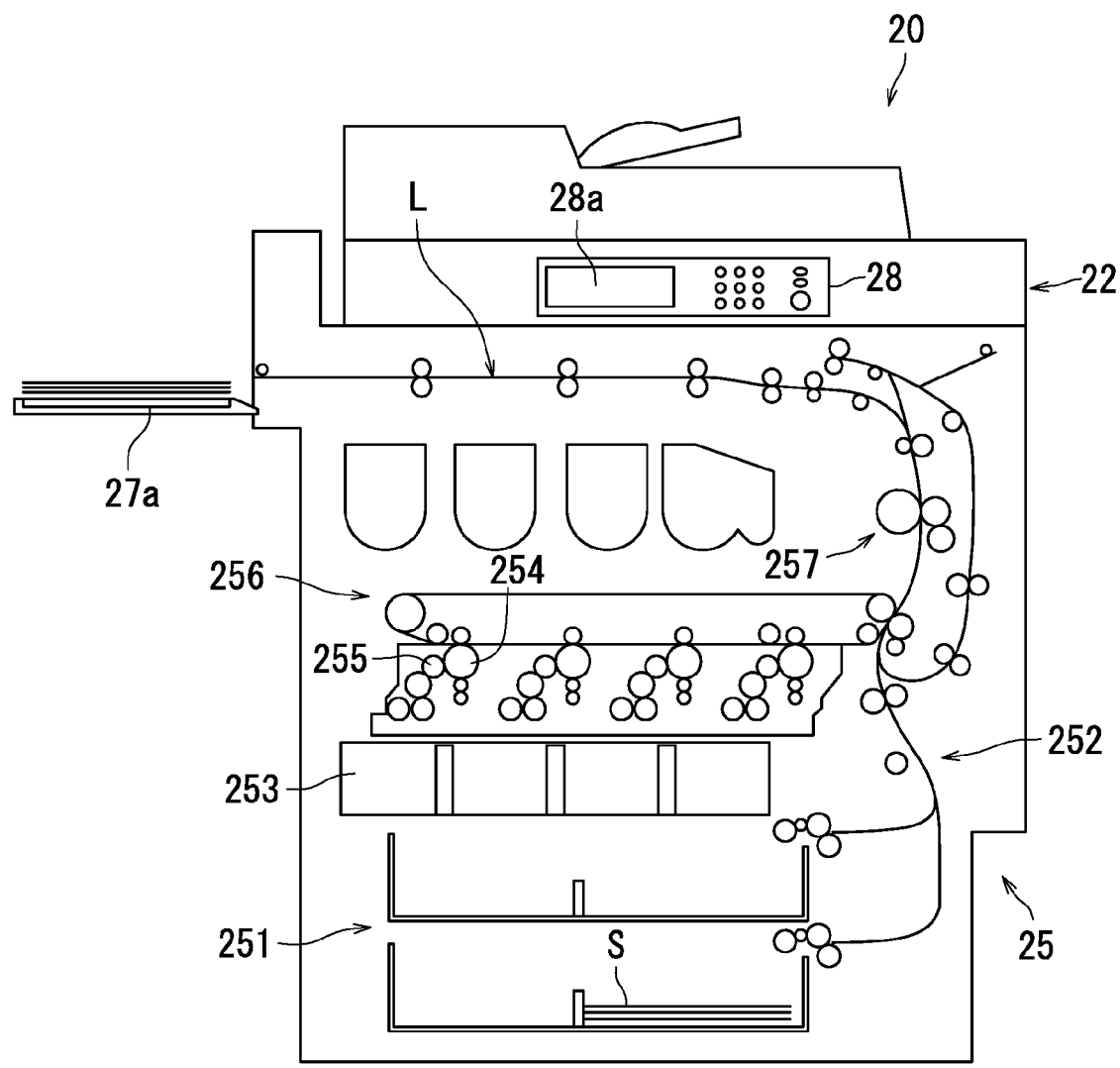
FIG. 7 illustrates an example configuration of an image forming apparatus according to an embodiment of the present disclosure.

The following describes an example configuration of an image forming apparatus 20 according to the embodiment of the present disclosure with reference to FIG. 7. FIG. 7 illustrates a configuration of the image forming apparatus 20. The image forming apparatus 20 may be a multifunction peripheral or a copier, for example.

As illustrated in FIG. 7, the image forming apparatus 20 includes an exit tray 27a in addition to the scanner 22, the image forming section 25, and the operation panel 28.

The image forming section 25 includes as mechanisms for performing printing on a sheet S, a sheet feeding device 251, a conveyor device 252, an exposure device 253, a photosensitive drum 254, a developing device 255, a transfer device 256, and a fixing device 257. The sheet feeding device 251 feeds a plurality of sheets S such as paper one at a time to the conveyor device 252. The conveyor device 252 conveys the sheet S fed by the sheet feeding device 251 to the exit tray 27a. The exposure device 253 irradiates the photosensitive drum 254 with laser light based on image data to form an electrostatic latent image. The developing device 255 supplies toner to the photosensitive drum 254 and develops the electrostatic latent image formed on the photosensitive drum 254 to form a toner image. The transfer device 256 transfers the toner image formed on the photosensitive drum 254 to the sheet S. The fixing device 257 fixes the transferred toner image to the sheet S. The sheet S on which the image is formed by the image forming section 25 (as a printed sheet subjected to printing) is ejected onto the exit tray 27a.

Through the above, a description has been made about the example configuration of the image forming apparatus 20.

Supplementary Explanation

The present disclosure is of course not limited to the embodiments described above and various alterations may be made without deviating from the essence of the present disclosure.

For example, the embodiment of the present disclosure describes a configuration of an electrographic image forming apparatus as an example image forming apparatus, which however should not be taken to limit the present disclosure. The present disclosure is applicable to an inkjet image forming apparatus.

What is claimed is:

1. An image forming apparatus comprising:
   a communication circuit that receives a print instruction from a user;
   an exit tray;
   an image forming section that performs printing on a sheet and ejects the printed sheet onto the exit tray;
   a print controller that causes the image forming section to perform printing based on the print instruction;
   a user identification section that identifies the user and manages log-in and log-out status of the user;
   a fetch sensor that detects whether or not the printed sheet ejected onto the exit tray is fetched;
   a notification managing section that changes, based on the user log-in or log-out status at completion of printed sheet ejection onto the exit tray and based on whether or not the printed sheet ejected onto the exit tray is fetched, a content of a notification that is to be issued to the user after completion of printed sheet ejection; and
   a motion sensor that detects whether or not the user leaves the image forming apparatus, wherein
   the user identification section performs automatic log-out, and
   the automatic log-out is processing to cause, when it is determined based on a result of detection by the motion sensor that the user leaves the image forming apparatus without log-out, automatic log-out of the image forming apparatus for user who logs in.

2. The image forming apparatus according to claim 1, wherein
   in a situation in which the user logs out at completion of printed sheet ejection and the printed sheet is fetched, the notification managing section issues to the user a fetcher confirmation notification that informs the user of the printed sheet being fetched by someone.

3. The image forming apparatus according to claim 1, wherein
   in a situation in which the user does not log out at completion of printed sheet ejection and the printed sheet is not fetched, the notification managing section issues to the user a misplacement notification that reminds the user to fetch the printed sheet.

4. The image forming apparatus according to claim 1, wherein
   the user identification section starts the automatic log-out upon the user logging in the image forming apparatus.

5. The image forming apparatus according to claim 1, wherein
   in a situation in which the user logs out at completion of printed sheet ejection and the printed sheet is not fetched, the notification managing section issues to the user a print completion notification that notifies completion of print matter ejection.

* * * * *